United States Patent
Jalote et al.

[11] Patent Number: 6,138,152
[45] Date of Patent: Oct. 24, 2000

[54] TECHNIQUE FOR EFFECTIVELY SERVING INFORMATION OBJECTS THROUGH A COMMUNICATION NETWORK

[75] Inventors: Pankaj Jalote, Bangalore, India; Sampath Rangarajan, Bridgewater; Shalini Yajnik, Scotch Plains, both of N.J.

[73] Assignee: Lucent Technologies Inc., Murray Hill, N.J.

[21] Appl. No.: 09/089,596

[22] Filed: Jun. 2, 1998

[51] Int. Cl.[7] .............................. G06F 15/16; G06F 15/17
[52] U.S. Cl. ........................ 709/219; 709/245; 707/203
[58] Field of Search ............................. 395/712; 709/217, 709/218, 219, 100, 102, 108, 245; 707/10, 203, 508; 345/347, 357

[56] References Cited

U.S. PATENT DOCUMENTS

| | | | |
|---|---|---|---|
| 5,642,503 | 6/1997 | Reiter | 707/203 |
| 5,717,926 | 2/1998 | Browning et al. | 709/104 |
| 5,754,857 | 5/1998 | Gadol | 709/300 |
| 5,919,247 | 7/1999 | Van Hoff et al. | 709/217 |
| 5,946,699 | 8/1999 | Sawashima et al. | 707/513 |
| 5,974,427 | 10/1999 | Reiter | 707/203 |
| 5,974,444 | 10/1999 | Konrad | 709/217 |
| 6,006,034 | 12/1999 | Heath et al. | 395/712 |

OTHER PUBLICATIONS

Raggett, Dave; "HTML 3.2 Reference Specification"; W3C Recommendation, Jan. 1997.

*Primary Examiner*—Mark H. Rinehart
*Assistant Examiner*—Marc D. Thompson

[57] ABSTRACT

In a communication arrangement, client terminals request information objects, e.g., hypertext markup language (HTML) documents, which are identified by their uniform resource locators (URLs) from a server system connected to the World Wide Web (WWW). For example, the information objects may represent different chapters of the same book and are thus logically connected. In accordance with the invention, when the logically connected information objects are updated, the updated versions of the information objects are stored in a temporary memory space. For those client terminals requesting the logically connected information objects by their URLs before the update, the server system consistently provides the original versions of the information objects at such URLs to the client terminals. However, for those client terminals requesting the logically connected information objects by their URLs after the update, the server system translates the given URLs to different URLs indicating the memory locations where the updated versions thereof are stored, thereby consistently providing the updated versions to the client terminals.

38 Claims, 2 Drawing Sheets

TECHNIQUE FOR EFFECTIVELY SERVING INFORMATION OBJECTS THROUGH A COMMUNICATION NETWORK

FIELD OF THE INVENTION

The invention relates to communications systems and methods, and more particularly to a system and method for providing information objects through a communication network such as the World Wide Web (WWW) or the web.

BACKGROUND OF THE INVENTION

As is well known, the World Wide Web (WWW) or the web is a graphical sub-network of the Internet. Through the WWW, a user at a client terminal can obtain information objects, e.g., hypertext markup language (HTML) documents, from different servers connected to the WWW. Each object is identified by a uniform resource locator (URL), and provided by a server associated with the URL to the client terminal through a connection, in accordance with a hypertext transfer protocol (HTTP). Using a conventional browser, the client terminal opens the information objects obtained thereby to allow the user to view the objects.

In accordance with the HTTP version 1.0 which is the current standard, each HTTP connection is typically established to transfer only one information object from a server to a client terminal, and then terminated. That is, even if multiple information objects need to be transferred from the same server to the same client terminal, the process of establishing and terminating an HTTP connection is repeated for each object transfer. However, use of such a connection to obtain objects may cause an "information inconsistency" problem. This problem, described below, arises when related information is distributed among a group of information objects in a server.

For example, a book may be presented by a server in chapters. Individual objects in the server representing different chapters of the book are logically connected, and form what is referred to as a "logical group." Individual objects representing quotes of the stocks of different companies at a particular time may form another logical group as a stock analyst may utilize the stock quotes to perform a market analysis corresponding to that particular time. However, objects in a logical group, e.g., those representing stock quotes, may be updated frequently. As a result, it is likely that after a client terminal receives a first object in a logical group through an HTTP connection, one or more of the remaining objects in the group are updated. When the client terminal receives a second object from the group through another HTTP connection, the second object may have been updated and is not contemporaneous with the first object. In that case, the client terminal receives timeinconsistent information as the first and second objects do not come from the same time-version of the logical group. In the stock quote example, such an information inconsistency problem frustrates the aforementioned market analysis which must be based on contemporaneous stock quotes or information objects belonging to the same version.

An attempt has been made to rectify the information inconsistency problem. This attempt calls for making the server unavailable for some time while an information update is being performed. This ensures that information objects in a logical group obtained in each session while the server is available come from the same version of the logical group. However, such an attempt incurs disruption in the service by the server during each update, which is undesirable and annoying especially when the service involves provision of real-time information, e.g., the aforementioned stock quotes, flight arrival and departure information, etc., which needs to be updated frequently.

Accordingly, there exists a need for a methodology whereby a server can effectively provide in a consistent manner information which is frequently updated, without having its service disrupted.

SUMMARY OF THE INVENTION

In accordance with the invention, a process forking mechanism is employed by a server to serve consistent information to each client terminal through a "persistent" HTTP connection, which allows more than one information object to be transferred therethrough. When a client terminal starts requesting from the server an information object, e.g., an information object in a logical group, the process forking mechanism forks a process, which is associated with the version of the logical group at the time of the forking, to serve the client terminal. This process survives as long as the persistent HTTP connection, and provides the client terminal with any information objects in the logical group in the version associated with the process only, despite any updated version of the logical group that emerges during the process. Thus, such a process advantageously provides the terminal with consistent information during the lifetime of the process, which is the same as the lifetime of the persistent HTTP connection.

Using the inventive technique, information objects in the logical group can be updated anytime without disrupting the service by the server as in the prior art. Updated information objects coexist with, and are stored in a memory space different from that of, their previous counterparts. A new process which is forked after an update is associated with a second version of the logical group which includes the updated information objects, and the new forked process advantageously serves consistent information corresponding to the second version of the logical group.

DETAILED DESCRIPTION

Figure 1:
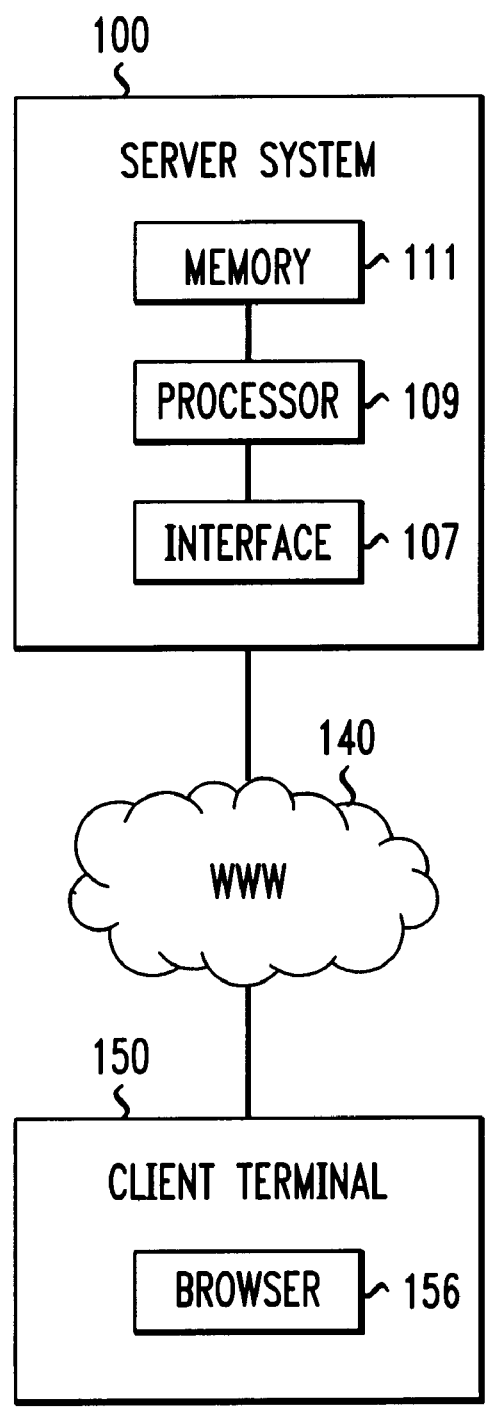
FIG. 1 illustrates a communication arrangement in accordance with the invention.

FIG. 1 illustrates a communication arrangement embodying the principles of the invention wherein server system 100 provides information objects, e.g., hypertext markup language (HTML) documents, through a communication network such as World Wide Web (WWW) 140, in accordance with the well-known hypertext transfer protocol (HTTP).

As shown in FIG. 1, a user may utilize client terminal 150, e.g., a personal computer, to request and obtain through WWW 140 an information object identified by its uniform resource locator (URL). Conventional browser 156 such as the NETSCAPE NAVIGATOR or INTERNET EXPLORER browser is installed in terminal 150. Assuming in this instance that the information object requested by terminal 150 resides in system 100, an HTTP connection is established in a well known manner between browser 156 and standard interface 107 in system 100. Upon receiving the request for the object through the HTTP connection, processor 109 in system 100 locates the requested object in memory 111, and transfers a copy of the located object to terminal 150 through the same connection. Using browser 156, terminal 150 opens the received object for the user to view the object thereon.

In accordance with the HTTP version 1.0, each HTTP connection is typically established to transfer only one information object from a server system to a client terminal, and then terminated. That is, even if multiple information objects need to be transferred from the same server system to the same client terminal, the process of establishing and terminating an HTTP connection is repeated for each object transfer. However, use of such a connection to obtain objects may cause an "information inconsistency" problem. This problem, described below, arises when related information is distributed among a group of information objects in a server system.

For example, a book may be presented by a server system in chapters. Individual objects in the server system representing different chapters of the book are logically connected, and form what is referred to as a "logical group." Individual objects representing quotes of the stocks of different companies at a particular time may form another logical group as a stock analyst may utilize the stock quotes to perform a market analysis corresponding to that particular time. However, objects in a logical group, e.g., those representing stock quotes, may be updated frequently. As a result, it is likely that after a client terminal receives a first object in a logical group through an HTTP connection, one or more of the remaining objects in the group are updated. When the client terminal receives a second object from the group through another HTTP connection, the second object may have been updated and is not contemporaneous with the first object received thereby. In that case, the client terminal receives time-inconsistent information as the first and second objects do not come from the same time-version of the logical group. In the stock quote example, such an information inconsistency problem frustrates the aforementioned market analysis which must be based on contemporaneous stock quotes or information objects belonging to the same version.

In accordance with the invention, server system 100 implements a process forking mechanism to serve multiple client terminals, and provides consistent information to each terminal through a "persistent" HTTP connection described below. In addition, the invention advantageously satisfies a "timeliness" requirement where once the information objects in a logical group are updated, each client terminal starting requesting information objects from such a logical group after the update receives the updated versions of the information objects.

It should be noted at this point that each time when server system 100 is restarted, processor 109 reads a configuration file in memory 1 11. The configuration file contains directives which are used by processor 109 to properly configure system 100. When a reconfiguration of server system 100 is desired, processor 109 may be interrupted by a specified signal to re-read the configuration file as part of a conventional signal handler routine. After re-reading the configuration file which contains modified directives corresponding to the reconfiguration, processor 109 resets internal parameters of server system 100, thereby realizing the reconfiguration.

In order to fully appreciate the invention, two of the directives used in the configuration file in system 100, namely, "Rewrite File" and "Keepalive" directives will now be described. The Rewrite File directive is typically used after an information object is relocated from a first URL to a second URL within the same server system. In that case, the specification of the Rewrite File directive may appear in the configuration file as follows:

Rewrite File first URL second URL [1]

For example, instructed by such a Rewrite File directive in the configuration file, processor 109 compares the URL in each incoming request with the first URL. If they match, processor 109 replaces the URL in the request with the second URL to where the requested object is relocated. Processor 109 then provides a copy of the requested object at the second URL to the client terminal requesting the object. Thus, in the prior art, by using the Rewrite File directive, the provision of the requested object is made transparent to the client terminal even though its request contains an outdated URL. However, in accordance with the invention, the Rewrite File directive is used here not because an information object has been moved from one URL to another. Rather, as fully described below, it is used for facilitating the aforementioned fork processing mechanism to consistently provide updated versions of information objects in a logical group, which coexist with the previous versions thereof.

The Keepalive directive in the configuration file is used in accordance with the invention to convert the HTTP connection pursuant to the HTTP version 1.0, which is terminated after each object transfer, to a persistent HTTP connection. The syntax which is well known for specifying the Keepalive directive is as follows:

Keepalive on|off[ timeout [ max. requests ]] , [2]

where "on|off" represents a flag for turning the Keepalive directive on or off; "timeout" represents the maximum pause in seconds allowed between the end of a request and the start of the next request beyond which the HTTP connection would be terminated by the server system; and "max.requests" represents the maximum number of object requests allowed to be served over the HTTP connection before it is terminated by the server system. Thus, for example, instructed by the following specified Keepalive directive in the configuration file:

Keepalive on 10 30, [3]

processor 109 causes an HTTP connection to be kept open until 30 information objects are transferred to a client terminal or until no new request is received from the client terminal for more than 10 seconds, whichever occurs first. As such, the resulting HTTP connection can survive a specified number of object transfers which may be more than one, and is thus referred to as a "persistent" HTTP connection.

It should be noted at this point that unlike the HTTP version 1.0, the HITTP version 1.1 which has been proposed provides for a persistent HTTP connection which allows any number of objects to be transferred therethrough until the server system or the client terminal connected thereto initiates a termination of such a connection. In that case, the server system may also utilize the above "timeout" and/or "max.requests" criteria to determine when to initiate the termination.

Processor 109 implements the aforementioned process forking mechanism to serve multiple client terminals requesting information objects in system 100. In accordance with such a mechanism, which is well known, processor 109 spawns or forks a child process to serve each client terminal after its first object request is received by processor 109. The child process includes locating the requested object and transferring same to the requesting terminal as described before.

Figure 2:
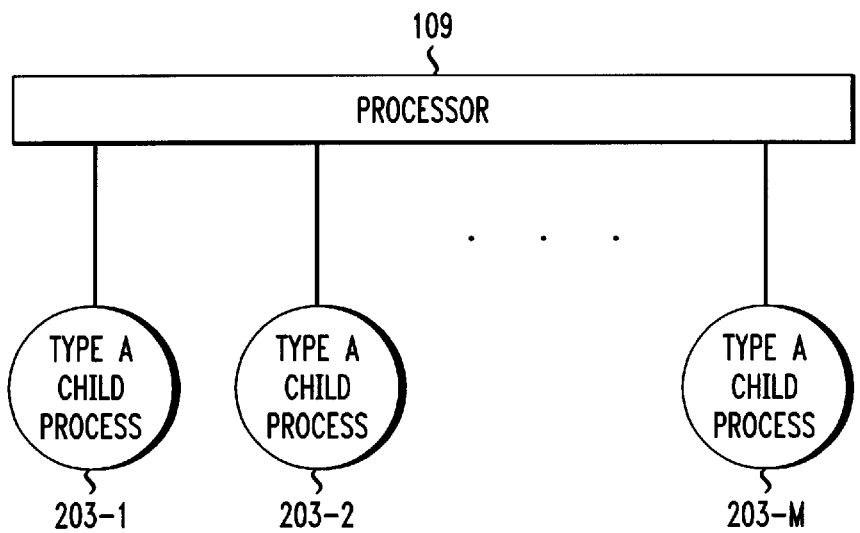
FIG. 2 illustrates a process forking mechanism used in the communication arrangement of FIG. 1.

By way of example, server system 100 provides a logical group of K information objects representing, e.g., stock quotes in this instance, at $URL_1$, $URL_2$, ... and $URL_K$, respectively, where K is an integer greater than one. FIG. 2 illustrates child processes 203-1 through 203-M forked by processor 109 for serving those particular client terminals, including terminal 150 in this instance, which request one or more of the objects from the logical group, where M is an integer greater than zero. Child processes 203-1 through 203-M are referred to as "type A child processes" here as they each provide first versions of the information objects representing the stock quotes corresponding to time A.

When a child process is forked by processor 109, the process is afforded a copy of the directives in the current configuration file, and administered according to the directives. In this instance, the copy of directives on which each of child processes 203-1 through 203-M is based includes Keepalive directive [3] described above, assuming that the HTTP version 1.0 is used, and no Rewrite File directive. Thus, utilizing a persistent HTTP connection by virtue of use of the Keepalive directive, the user at terminal 150 for example may obtain selected stock quotes corresponding to time A from their associated URL's to perform a market analysis, e.g., to compute the Dow Jones industrial stock average, corresponding to time A. It should be noted at this point that each terminal being served by a child process continues to be served by the same child process as long as the persistent connection between the terminal and system 100 remains intact.

Due to the time-sensitive nature of stock prices, system 100 updates the information objects representing the stock quotes periodically. Thus, while the user at terminal 150 is obtaining the selected stock quotes via a type A child process, the information objects representing the stock quotes may be updated at time B to reflect the latest prices, where B>A. In accordance with the invention, second versions of the information objects representing the updated stock quotes are stored in a temporary space in memory 111 at $URL'_1$, $URL'_2$, ..., and $URL'_K$, which are different from $URL_1$, $URL_2$, ..., and $URL_K$ where the first versions of the respective information objects are located. That is, the first and second versions of the information objects in the logical group at this point coexist. In addition, the configuration file in system 100 is changed to include Rewrite File directive [1] described above for each updated information object, where first $URL=URL_i$ and second $URL=URL'_i$, $1 \leq i \leq K$. That is, the configuration file is changed to redirect all requests for any information objects in the logical group, which are received after the update, to the updated versions thereof. To effect such a change, processor 109 is interrupted to re-read the modified configuration file. After the update at time B, when any client terminal which currently is not served by a child process requests an information object in the logical group, processor 109 forks a "type B child process" corresponding to time B to serve the terminal.

Figure 3:
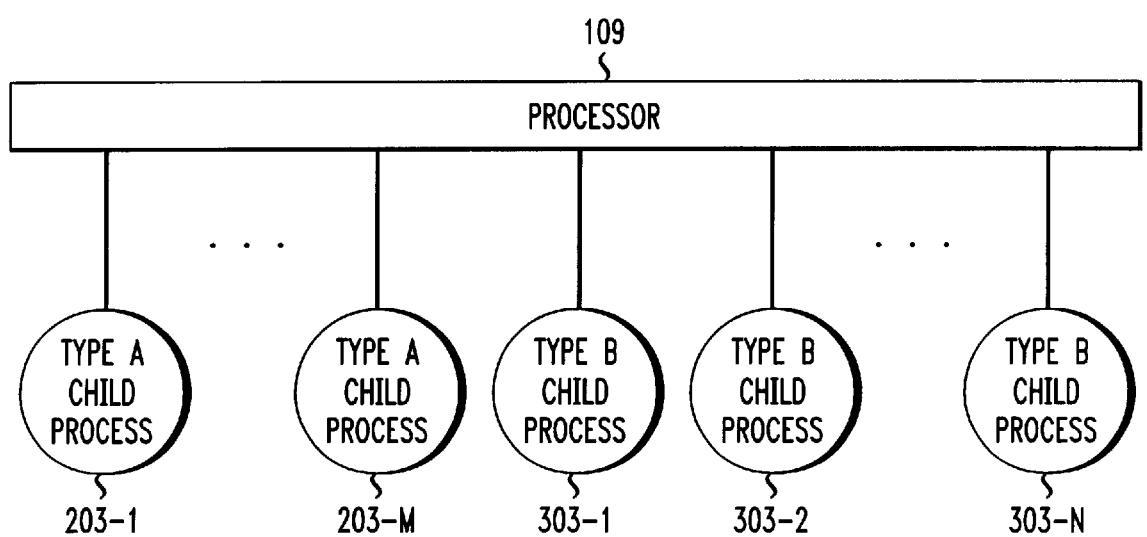
FIG. 3 illustrates the process forking mechanism in a state different from that illustrated in FIG. 2.

FIG. 3 illustrates type B child processes 303-1 through 303-N forked by processor 109 at a certain point after the update at time B, where N is greater than zero. Each type B child process is afforded a copy of the directives in the current configuration file including the Rewrite File directives described above. Pursuant to such Rewrite File directives, each type B child process provides the client terminal served thereby with the second versions of the information objects in the logical group stored in the aforementioned temporary memory space, which represent the updated stock quotes.

Assuming that no persistent HTTP connections associated with client terminals, including terminal 150, being served by type A child processes 203-1 through 203-M have been terminated, these type A child processes coexist with type B child processes 303-1 through 303-N. As mentioned before, such type A processes survive as long as the corresponding persistent HTTP connections. Since each type A child process is administered based on the copy of the directives in the configuration file at the time the child process was forked, the process remains unchanged, despite the above changes in the configuration file. In addition, since the directives in the configuration file at that time do not include the Rewrite File directives, each client terminal served by a type A child process continues to obtain the first versions of the information objects located at $URL_1$, $URL_2$, ..., and $URL_K$. Thus, continuing the above example, the user at terminal 150 being served by a type A child process continues to receive the first versions of the information objects representing stock quotes corresponding to time A until the associated persistent connection is terminated, even though the stock quotes have been updated. As a result, the user can advantageously rely on the consistent information provided by the type A child process to perform the market analysis corresponding to time A.

It should be noted at this point that with the inventive arrangement, the aforementioned "timeliness" requirement is met as once the information objects in the logical group are updated, each client terminal starting requesting information objects in such a logical group after the update is served by a type B child process, thereby receiving the updated versions of the information objects.

It should also be noted that after all the type A child processes are terminated, it may be desirable to have the first versions of the information objects at $URL_1$, though $URL_K$ overwritten by the second versions thereof. The Rewrite File directives in the configuration file can then be deleted, thereby preventing the configuration file from growing with additional Rewrite File directives each time when an update is performed. After re-reading of the configuration file, the new child processes provide the second versions of the information objects from $URL_1$ though $URL_K$, instead of the redirected $URL'_1$ though $URL'_K$.

The above process is repeated when the information objects in the logical group are again updated. However, only after all the type B processes are terminated, may the aforementioned temporary memory space be re-used for storing the newer, updated versions of the information objects. In the meantime, such newer, updated versions are stored in another temporary memory space.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, in the disclosed embodiment, the updated versions of the information objects in a logical group coexist with the previous versions thereof in the same server system, and a Rewrite File directive is used in the configuration file to indicate where the updated versions are. However, it will be appreciated that where the information objects in a logical group in a server system are fully replicated in one or more other server systems, it may be efficient to update the information objects in one of the server systems, and copy the updated versions onto the other server systems one at a time in a staggered manner. In that case, a "Rewrite Redirect" directive may similarly be used in the configuration file in a non-updated server system to indicate the identity of the server system where the updated versions can be found.

In addition, it will be appreciated that where the termination of a persistent HTTP connection pursuant to the HTTP version 1.1 can be initiated by a client terminal, as opposed to a server system, the client terminal will be provided with an option to terminate such a connection, thereby controlling its length during which the terminal receives the information objects in the same version.

Finally, server system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for serving information objects in a group comprising:

a memory for providing a plurality of versions of the group of information objects;

an interface for realizing a connection connected to the apparatus to receive a plurality of requests for information objects in the group through the connection; and a processor for generating a process, which is associated with one of the versions of the group of information objects, as a function of a time when the earliest request of all the requests is received, the process serving information objects through the connection in response to the requests, each information object served being in the group of the version associated with the process.

2. The apparatus of claim 1 further comprising a controller for controlling a termination of the connection.

3. The apparatus of claim 1 wherein a subset of information objects in a first version of the group are identical to a subset of information objects corresponding thereto in a second version of the group.

4. The apparatus of claim 3 wherein the communication network includes at least part of a World Wide Web (WWW).

5. The apparatus of claim 4 wherein the connection includes a hypertext transfer protocol (HTTP) connection.

6. The apparatus of claim 1 wherein a subset of information objects in the first version of the logical group are identical to a subset of information objects corresponding thereto in the second version of the logical group.

7. The apparatus of claim 1 wherein the information objects in the group represent stock quotes.

8. The apparatus of claim 1 wherein the information objects in the group represent different parts of a compilation.

9. The apparatus of claim 1 wherein the processor includes the controller.

10. A system for serving at least one terminal with one or more of information objects in a group through a connection established by the terminal, at least first and second versions of the group of information objects being available, the first version of the group of information objects preceding the second version of the group of information objects, the system comprising:

an interface for receiving from the terminal through the connection at least first and second requests for first and second information objects in the group, respectively, the first request being received after the first version of the group of information objects is available but before the second version thereof is available, the second request being received after the second version thereof is available; and a processor for generating a process, which is associated with the first version of the group of information objects, as a function of a time when the first request is received, and the process being assigned to serve the terminal, the terminal being served with the first and second information objects each in the first version associated with the process in response to the first and second requests, respectively.

11. The system of claim 10 wherein the process is administered based on at least one directive given at the time when the process is generated.

12. The system of claim 10 wherein the terminal is connected to the interface through a communication network.

13. The system of claim 12 wherein the communication network includes at least part of a WWW.

14. The system of claim 13 wherein the terminal includes a browser.

15. The system of claim 10 wherein the processor generates a second process for providing one or more of the information objects in the group through a second connection, a third request for a selected information object in the group being received through the second connection after the second version of the group of information objects is available, the second process, in response to the third request, providing the selected information object in the group of the second version.

16. The system of claim 15 wherein the second process is administered based on at least one directive indicative of a location where the selected information object in the group of the second version is available.

17. The system of claim 10 wherein the information objects in the group represent stock quotes.

18. The system of claim 10 wherein the information objects in the group represent different parts of a compilation.

19. The system of claim 10 wherein the processor includes the interface.

20. A system for serving a plurality of information objects in a group, the system comprising:

means for storing first versions of the respective information objects in the group;

means for receiving at least a first request for a first selected information object in the group, and a second subsequent request for a second selected information object in the group through a connection connected to the system;

means responsive to the first request for generating a process, which is associated with the first versions of the respective information objects in the group, as a function of a time of the first request, the process providing the first version of the first selected information object through the connection; and means for updating at least the second selected information object between the time of the first request and that of the second subsequent request, the process providing the second selected information object in the first version associated with the process through the connection in response to the second subsequent request.

21. The system of claim 20 further comprising means for controlling a termination of the connection.

22. The system of claim 20 wherein the process is administered based on at least one directive given at the time when the process is generated.

23. The system of claim 20 wherein the connection connects the system to a communication network.

24. The system of claim 23 wherein the communication network includes at least part of a WWW.

25. A method for use in an apparatus for serving information objects in a group comprising:

providing a plurality of versions of the group of information objects;

realizing a connection connected to the apparatus to receive a plurality of requests for information objects in the group through the connection; and generating a process, which is associated with one of the versions of the group of information objects as a function of a time when the earliest request of all the requests is received, the process serving information objects through the connection in response to the requests, each information object served being in the group of the version associated with the process.

26. The method of claim 25 further comprising controlling a termination of the connection.

27. The method of claim 25 wherein a subset of information objects in a first version of the group are identical to a subset of information objects corresponding thereto in a second version of the group.

28. The method of claim 25 wherein the information objects in the group represent stock quotes.

29. The method of claim 25 wherein the information objects in the group represent different parts of a compilation.

30. A method for use in a system for serving at least one terminal with one or more of information objects in a group through a connection established by the terminal, at least first and second versions of group of information objects being available, the first version of the group of information objects preceding the second version of the group of information objects, the method comprising:

receiving from the terminal through the connection at least first and second requests for first and second information objects in the group, respectively, the first request being received after the first version of the group of information objects is available but before the second version thereof is available, the second request being received after the second version thereof is available;

generating a process, which is associated with the first version of the group of information objects, as a function of a time when the first request is received, the process being assigned to serve the terminal; and serving the terminal with the first and second information objects each in the first version associated with the process in response to the first and second requests, respectively.

31. The method of claim 30 wherein the process is administered based on at least one directive given at the time when the process is generated.

32. The method of claim 30 wherein the process generating includes generating a second process for providing one or more of the information objects in the group through a second connection, a third request for a selected information object in the group being received through the second connection after the second version of the group of information objects is available, the second process, in response to the third request, providing the selected information object in the group of the second version.

33. The method of claim 32 wherein the second process is administered based on at least one directive indicative of a location where the selected information object in the group of the second version is available.

34. The method of claim 30 wherein the information objects in the group represent stock quotes.

35. The method of claim 30 wherein the information objects in the group represent different parts of a compilation.

36. A method for use in a system for serving a plurality of information objects in a group, comprising:

storing first versions of the respective information objects in the group;

receiving at least a first request for a first selected information object in the group, and a second subsequent request for a second selected information object in the group through a connection connected to the system;

in response to the first request, generating a process, which is associated with the first versions of the respective information objects in the group, as a function of a time of the first request, the process providing the first version of the first selected information object through the connection;

updating at least the second selected information object between the time of the first request and that of the second subsequent request; and in response to the second subsequent request, providing the second selected information object in the first version associated with the process through the connection.

37. The method of claim 36 further comprising controlling a termination of the connection.

38. The method of claim 36 wherein the process is administered based on at least one directive given at the time when the process is generated.

* * * * *